Oct. 30, 1956 J. A. HARDY 2,768,585
PUMP CONTROL MECHANISM
Filed Dec. 18, 1952 2 Sheets-Sheet 2
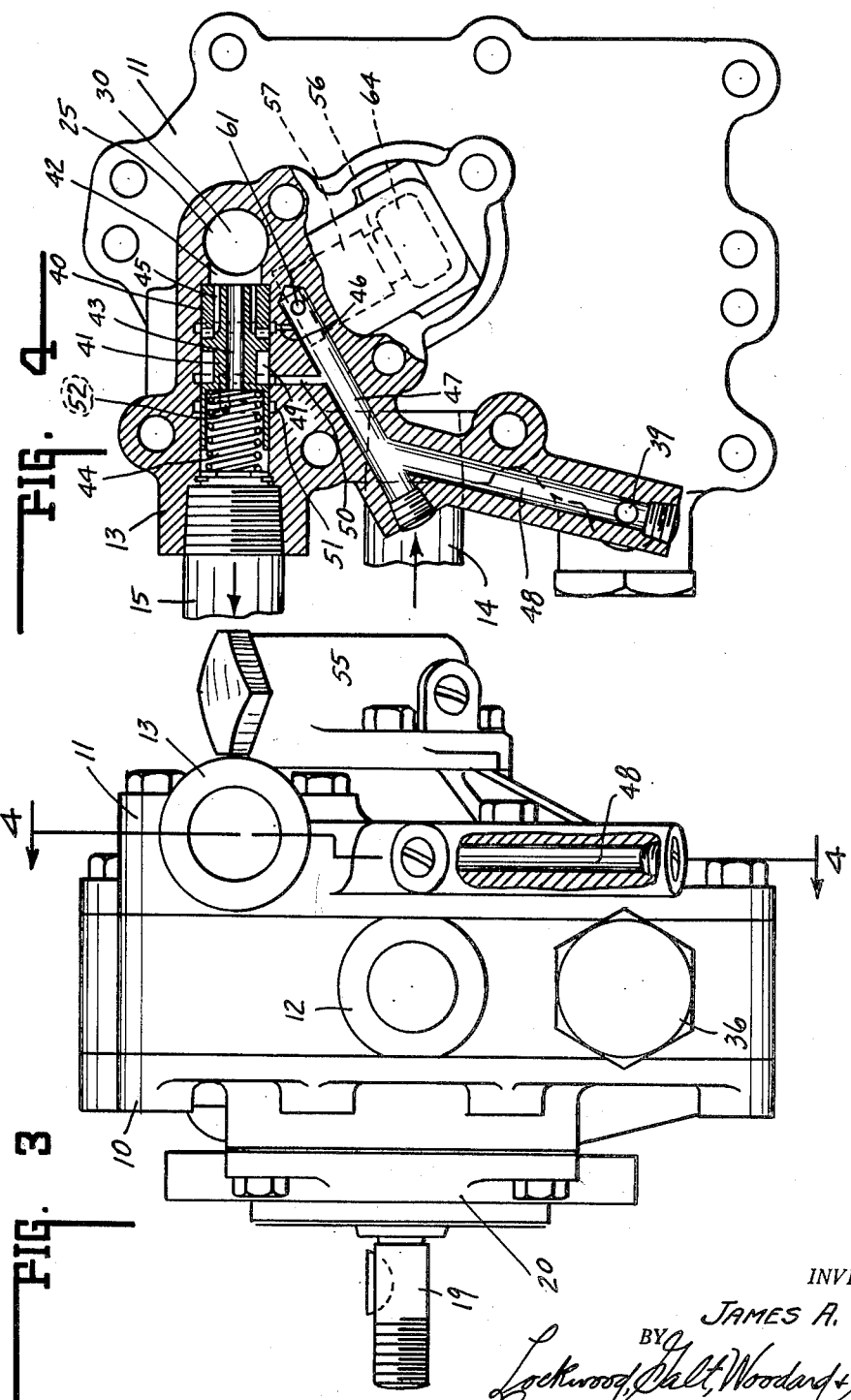
INVENTOR.
JAMES A. HARDY.
BY
Lockwood, Galt, Woodard + Smith.
ATTORNEYS.

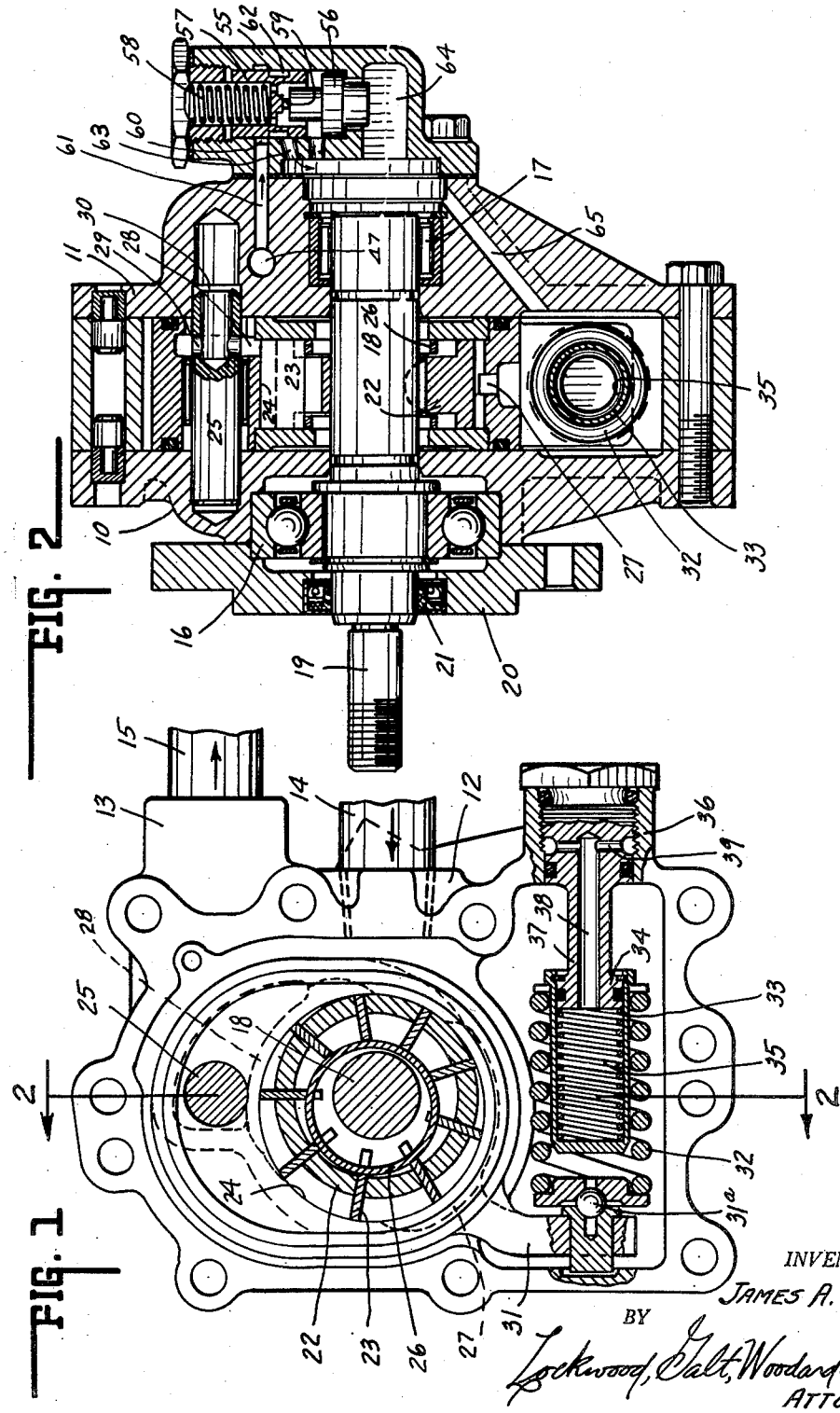

2,768,585

PUMP CONTROL MECHANISM

James A. Hardy, Indianapolis, Ind., assignor to Schwitzer Corporation, Indianapolis, Ind., a corporation Application December 18, 1952, Serial No. 326,733

9 Claims. (Cl. 103—120)

This invention relates to a pump control mechanism particularly applicable to a variable displacement pump, such as may be employed in connection with actuating vehicle steering mechanism, or for any other suitable purpose.

It is the object of the invention to control a variable displacement pump between its pumping position and its neutral or non-pumping position through mechanism for limiting its fluid displacement to a predetermined fluid pressure; provide for a controlled rate of fluid flow; and discontinue the pumping action in event of excessive fluid temperatures.

These features, as incorporated in this invention, are of particular value in a pump applied to a hydraulic steering mechanism, such as in the case of heavy duty vehicles, wherein it is desirable to have a relatively large quantity of oil delivered at low engine and pump speeds without a commensurate increase at high speeds. In order to obtain the desired large quantity of oil delivery, a high capacity pump is necessary. While the ordinary fixed displacement pump may deliver sufficient oil at low speeds it will deliver excessively large quantities of oil at high speeds, such excessive quantities requiring extremely large oil lines and valves. Furthermore, an excessive rate of oil flow results in high oil temperatures and power losses because the surplus must be by-passed through a relief valve.

It is therefore the purpose of this invention to provide a pump which automatically adjusts its displacement so that at no time will it pump more oil than is required. Thus, as distinguished from the usual fixed displacement pump, when the outlet is shut off or flow decreased, no oil is pumped through a relief valve, but only enough oil is pumped to take care of the demand and any leakage losses within the pump itself. This results in a minimum of power loss and heat generation in the hydraulic system.

In view of the above, one feature of this invention resides in a variable flow control device actuated according to the demand on the pump regardless of the engine or driving speed, which controls the pump's displacement up to a maximum pre-determined pressure.

Another feature resides in a thermostatically controlled valve so located as to be affected by the oil temperature internally of the pump, and in event of an excessively high temperature developing, will automatically reduce the displacement by permitting the pump to approach its non-pumping position. By reason of the reduced displacement and pressure, the temperature of the oil will drop causing the valve to assume its normal position whereupon the pumping action at the prescribed pressure and flow will be resumed. This arrangement is of importance as acting to prevent damage to the pump or steering mechanism in case the steering valve is held in a position so that the pump outlet is shut off for long periods of time. Under these conditions the temperature of the pump becomes excessive, which condition is prevented by the thermostatically controlled valve.

The full nature of the invention will be understood from the accompanying drawings and the following description and claims:

Fig. 1 is an end view of the pump in axial direction having bearing retaining plate 20 and housing end plate 10 removed and showing rotor and pressure controlling mechanism in section.

Fig. 2 is a section taken on the line 2—2 of Fig. 1 with portions shown in elevation.

Fig. 3 is a side elevation of the pump taken on the outlet and inlet side thereof.

Fig. 4 is a side elevation of the pump with a section taken through the line 4—4 of Fig. 3 and the housing nuts removed.

In the drawings there is shown, as illustrative of one modification of the invention, a vane type variable displacement pump designed particularly for use in connection with a steering valve such as employed for actuating steering mechanism through hydraulic power under "finger tip" control. Said pump includes a housing plate 10 and an opposed housing plate 11, the intermediate portion of the housing having an oil intake boss 12 and the plate 11 having an oil discharge outlet boss 13. These bosses are connected with the intake and discharge oil flow lines 14 and 15, respectively. Mounted in suitable bearings transversely of the housing, and as indicated at 16 and 17, there is a drive shaft 18 having an extension 19 through which it is driven from a suitable source of power such as the propelling engine of the vehicle being steered. Secured to the plate 10 there is a bearing retaining plate 20 incorporating a suitable shaft packing unit 21.

Keyed to the shaft 18 there is a rotor 22 radially slotted to slidably receive a series of equally spaced vanes 23. Said rotor is rotated within a movable fluid displacement control member here shown as a pumping ring 24. Said ring is of greater diameter than the rotor, the inner wall of which is scavenged by the ends of the vanes 23. Said pumping ring is pivotally supported upon a pin 25 to swing thereon from non-pumping position concentric with the rotor to pumping position eccentric therewith. Within the rotor surrounding the shaft 18 there is a pair of spaced spacer rings 26 upon which the inner portion of each of the vanes rides for holding said vanes in contact with the inner surface of the pumping ring.

About that portion of the pumping ring opposite its pivot pin 25 there is formed within the inner wall thereof an intake port 27. At the opposite side of the pumping ring toward its pivot pin there is provided in its inner wall an outlet port 28. The outlet port 28 is in communication with radial ports adjacent one end of the pivot pin leading to a hollow portion thereof indicated at 29 opening into a chamber 30 which in turn communicates with the discharge line 15, the intake port 27 communicating with the intake line 14.

As is well known in pumps of this character, the pumping ring is biased about its pivot support under spring tension toward its eccentric pumping position, in whch position it operates to displace the fluid and flow in the discharge line until the flow is resisted sufficiently to build up a maximum predetermined pressure. Such pressure reacts upon the pumping ring tending to swing it toward its concentric non-pumping position against the tension of the spring. For that purpose, as shown herein, the pumping ring is provided with an outwardly extending boss 31 positioned substantially opposite the pivot pin, but to one side of a plane taken through the pivot pin and shaft. Said boss and, therefore, the pumping ring are forceably urged toward eccentric pumping position by a variable biasing structure including the compression load spring 32 bearing at one end against said boss through the medium of a universal ball bearing 31a.

In the usual arrangement of said load spring it is fixedly mounted at its other end so that upon a predetermined maximum pressure being developed it will be compressed sufficiently to permit the pumping ring to assume its non-pumping concentric position. However, in this invention said other end of the load spring is variably mounted upon a sliding fluid pressure actuated control cylinder 33 which serves as a pressure actuated control. Said cylinder is mounted to reciprocate upon a fixed piston 34. It is urged toward its extended position upon said piston by a light spring 35, as shown in Fig. 1. Said piston is secured at its supported end to a boss 36 through a stem 37 having a bore 38 extending therethrough and opening into said cylinder. Through a passage 39 in the boss 36 fluid is admitted to the cylinder according to the flow discharged from the pump so that the fluid in the cylinder acts to control its axial displacement relative to the fixed piston and load spring 32 and, therefore, vary the force inherent in the load spring which in turn controls the position of the pumping ring.

For the purpose of controlling such variable biasing structure, controlled fluid pressure is developed in the cylinder 33 for the purpose of compressing or elongating the load spring 32. For this purpose a flow actuated control mechanism is provided as shown in Fig. 4. Said mechanism comprises a cylindrical bore 40 formed in the housing plate 11 in which a valve piston 41 operates in line with the discharge outlet at 13, 15. Said cylindrical bore is in communication through a passage 42 with the outlet 30 adjacent the hollow end 29 of the pivot pin 25. Said piston has a central passage 43 through which fluid is discharged to the outlet line 15, and is biased in a direction opposing the flow by a compression spring 44. Surrounding the passage 43 there are provided by-pass ports 45 in the intake end of the piston, said ports communicating with a port 46 leading to the bores 47, 48 for delivering fluid to the passage 39 leading to the controlled cylinder 33.

Said valve piston 41 is further provided with an annular recess 49 adapted to bridge a port 50 communicating with the bore 47, and a recess 51 communicating with the pump intake through a port 52 in the housing plate 11. This arrangement is such that the normal flow of the pump is delivered to the intake end of the valve piston 41 and passes through the passage 43 to the outlet flow line 15. However, there will be a diversion thereof through the ports 45, and bores 47, 48 into the pressure actuated cylinder 33. The diameter of the passage 43 is proportioned relative to the spring 44 so that when the desired rate of flow is attained, the pressure drop through the passage will cause the valve to move to the left against the force of said spring. This movement of the piston closes the by-pass ports 45, trapping the oil in the cylinder 33 which serves to retain the cylinder and therefore the load spring in a position that will provide the desired rate of flow. In this position the maximum predetermined pressure and fluid displacement is controlled by said load spring.

The movement of the flow controlled valve piston 41 to the left is effected through a differential pressure drop between its ends resulting from the desired rate of flow therethrough, but upon the flow being resisted and diminished by a reduced demand, the spring 44 will return the piston to its position, as shown in Fig. 4. The oil passing through the bores 45 and passages 47, 48 forces the sliding cylinder to the left into the position shown in Fig. 1 for compressing the load spring 32. In Fig. 1 spring 32 is in its maximum compressed position with the cylinder extended which has the effect of increasing the eccentricity of the pumping cylinder which increases the oil flow from the pump.

As the oil flow increases, due to the above, the pressure drop across the passage 43 in the flow controlled valve will increase until the piston 41 is moved sufficiently to the left against the force of spring 44 to close the port 46 so that no additional oil will be admitted to the sliding cylinder 33, whereupon only the desired amount of oil will be pumped. If the driven speed of the pump increases its displacement, oil flow will tend to increase beyond the amount desired, whereupon the differential pressure on the piston 41 will force it to the left sufficiently to bridge the port 50 and recess 51. Thereupon oil will flow out of the cylinder 33 through the bores 48, 47 back to the pump intake relieving the fluid pressure and permitting the load spring to elongate. The force of the load spring 32 will thereby be reduced through the cylinder 33 sliding to the right upon release of oil therefrom, and thereby decrease the eccentricity of the pump ring until a reduced amount of flow it attained.

If the pump outlet is shut off, the sliding cylinder 33 will move to the extreme left position, as shown in Fig. 1. In this position the maximum spring force is obtained and the pump pressure will increase until such spring force is overcome. As it overcomes the spring force the eccentricity will be reduced so that only enough oil will be pumped to maintain the maximum pressure, but with a minimum of flow.

Particularly in the application of the pump to a vehicle steering mechanism, the temperature of the oil may become excessive. This is apt to occur when the motor of the vehicle is running and driving the pump while the steering mechanism is held in its maximum turned position, closing the pump outlet for a long period of time. Under such conditions the temperature of the pump becomes exceedingly high. For this reason it is desirable to stop the pumping action, i. e. cause the pumping ring to assume its concentric position upon the oil temperature reaching a predetermined value. This is controlled by the thermostatic control valve, as shown in Fig. 2, mounted in a boss 55. Said valve includes a thermostatic element 56 and a valve piston 57 biased to closed position by a compression spring 58.

The thermostatic element is filled with a suitable material that expands with increased temperatures. Said element therefore expands with increase in oil temperature, in a direction to project a small piston 59 upwardly against the underside of the piston valve 57 against the force of spring 58. The boss is provided with a groove 60 surrounding the piston valve, communicating with the sliding cylinder 33 through a port 61 (Fig. 4). Said groove 60 lies adjacent a groove 62 formed about the piston valve which communicates through a passage 63 with a chamber 64 in said boss, and a bore 65 communicating with port 27 and leading to the pump intake. The oil that seeps past the piston ring shaft seal 67 and through bearing 17 will flow into chamber 64. The temperature of this oil affects the thermostatic element 56.

Upon expansion of said element through excessive oil temperature, the piston valve 57 will be forced upwardly against the compression spring 58 until the piston groove 62 bridges the groove 60 and port 63. This causes the oil in cylinder 33 to pass into the intake of the pump through passages 47, 48, relieving the pressure in the sliding cylinder 33. The fluid pressure on the load spring 32 is thus reduced for the reason that the sliding cylinder 33 will then be free to move to the right as far as the load spring tends to move it against only the very light resistance of the spring 35. The pumping ring 24 will thereby be permitted to swing toward zero eccentricity or its concentric position so that little or no oil will be pumped until the temperature falls sufficient to cause the thermostatic element to permit the piston valve 57 to close the port 61.

The invention claimed is:

1. In a variable displacement pump having a fluid intake and discharge outlet, including a movable fluid displacement control member, a load spring having one end engaging said member in a direction to urge it toward its pumping position, a fluid pressure controlled means engaging the other end of said spring for fluid pressure control of the spring load thereof, a flow actuated control means in the discharge line of said pump comprising a piston valve having an orifice therethrough, a passage from said discharge line to said fluid pressure controlled means, a relief passage leading from said controlled means to the intake of said pump, said passages being selectively controlled by said piston valve, and a pressure spring positioned to bias said valve to a position to open said first passage to said discharge line to charge said controlled means with fluid under pressure, the orifice of said valve being proportioned to induce a differential pressure thereacross in a direction to move said valve against said pressure spring upon the desired flow being attained to close said first passage.

2. In a variable displacement pump having a fluid intake and discharge outlet, including a movable fluid displacement control member, a load spring having one end engaging said member in a direction to urge it toward its pumping position, a fluid pressure controlled biasing means operatively coupled with said member to urge said member toward its pumping position for increasing the displacement of the pump upon increase of said fluid pressure, a thermostatically actuated valve positioned to be affected by the internal temperature of said pump, a fluid passage from said fluid pressure controlled biasing means, a passage from the intake side of said pump communicating through said valve, and a spring for biasing said valve toward a normal position for closing said passages, the temperature responsive element of said valve being actuated by excessive temperature against said spring to open said passages for releasing fluid in said means to the intake side of said pump and permitting said member to move toward its non-pumping position.

3. In a variable displacement pump having a fluid intake and discharge outlet, including a driven rotor having a plurality of sliding vanes, a pumping ring surrounding said vanes and movable between an eccentric fluid pumping position and a concentric non-pumping position relative to said rotor, a load spring having one end engaging said ring in a direction to urge it toward its eccentric position, a hydraulic cylinder and piston operatively mounting the other end of said spring to compress said spring under fluid pressure, a thermostatically actuated valve positioned to be affected by the internal temperature of said pump, a fluid passage from said cylinder to said valve, a fluid passage from the intake side of said pump to said valve, and a spring for biasing said valve toward a normal position for closing said passages, said valve being actuated by excessive temperature against said spring to open said passages for releasing fluid in said cylinder to the intake side of said pump and for permitting said ring to move toward its concentric non-pumping position.

4. In combination in a variable displacement pump with a movable element for varying the displacement and pumping rate of the pump, pressure-operated hydraulic means for moving said element; movable means in the discharge outlet of the pump responsive only to rate of fluid flow in the outlet, means associated with said movable means producing a variable hydraulic pressure which is a function only of said rate of fluid flow, and means applying said pressure to said pressure-operated hydraulic means.

5. In a variable displacement pump having a fluid intake and discharge outlet, in combination a power-driven rotor having a plurality of sliding vanes, a movable fluid displacement control ring surrounding said vanes and movable about a pivot support between an eccentric fluid pumping position and a concentric non-pumping position relative to said rotor, a hydraulic pressure-responsive variable biasing structure operatively coupled to said ring to forcibly bias said ring toward pumping position, a main flow line from the discharge outlet of the pump, a fluid line communicating at one end with said hydraulic pressure structure and at the other end with both said intake and discharge outlets; a valve structure selectively connecting said line to said inlet and outlet, and movable means in said main line responsive to the rate of fluid flow in said main line for operating said valve to selectively admit low and high pressure fluid to said hydraulic pressure-responsive structure.

6. In a variable displacement pump having a fluid intake and discharge outlet including a power-driven rotor having a plurality of sliding vanes, a pumping ring surrounding said vanes and movable between an eccentric fluid pumping position and a concentric non-pumping position relative to said rotor, biasing means responsive to fluid pressure operatively coupled to said ring to urge said ring toward its eccentric position for increasing the displacement of the pump, a main flow line from the discharge outlet of said pump, a first duct terminating at one end in said fluid pressure-controlled biasing means, second and third ducts communicating, respectively, with said pump intake and outlet, a valve structure for selectively coupling the other end of said first duct with said second and third ducts; and means responsive to the rate of flow in said outlet to operate said valve.

7. In a variable displacement pump having a fluid intake and discharge outlet including a power-driven rotor having a plurality of sliding vanes, a pumping ring surrounding said vanes and movable between an eccentric fluid pumping position and a concentric non-pumping position relative to said rotor, a fluid pressure responsive biasing means operatively coupled with said ring, a main flow line from the discharge outlet of said pump, a first duct terminating at one end with said fluid pressure biasing means, a second and third duct communicating respectively with said intake and outlet; a piston, with a constricted passage therethrough, in said main flow line; a valve, responsive to movement of said piston regulating the flow from said first duct, respectively, to said second and third ducts, said valve being actuated by differential pressure resulting from the flow through said constricted passage; and a thermostatically actuated valve internally of said pump in passage between said intake and said first duct, said valve being movable under a predetermined increase in temperature in the pump to open said first duct.

8. In a variable displacement pump having a fluid intake and discharge outlet, movable means for selectively varying the displacement, a fluid pressure responsive biasing means operatively coupled with said movable means, and a thermostatically actuated valve connected in a duct between the intake side of said pump and said fluid pressure biasing means, said valve being normally positioned to disconnect said biasing means and pump intake and movable under predetermined increase in fluid temperature to connect said biasing means and pump intake for relieving the fluid pressure of said biasing means and cause a reduction in the fluid displacement of said pump.

9. In a variable displacement pump having a fluid intake and discharge outlet, including a movable fluid displacement control member, a load spring having one end engaging said member in a direction to urge it toward its pumping position, a fluid cylinder operatively mounting the other end of said spring, a piston in said cylinder having a rigidly mounted piston stem provided with a fluid passage therethrough for slidably projecting said cylinder in a direction to compress said spring under fluid pressure, and permit retraction of said cylinder and elongation of said spring to reduce its effective pressure on said member upon fluid being relieved from said cylinder, and control means responsive to fluid flow in the discharge line of said pump; and a valve, responsive to said control means, regulating fluid under pressure to said cylinder through said passage.

(References on following page)

References Cited in the file of this patent

UNITED STATES PATENTS

| | | |
|---|---|---|
| 1,943,929 | Rayburn | Jan. 16, 1934 |
| 2,064,421 | Erskine | Dec. 15, 1936 |
| 2,087,772 | Kempthorne | July 20, 1937 |
| 2,238,062 | Kendrick | Apr. 15, 1941 |
| 2,291,424 | Wichorek | July 28, 1942 |
| 2,296,876 | Samiran et al. | Sept. 29, 1942 |
| 2,309,148 | Wilson et al. | Jan. 26, 1943 |
| 2,318,337 | Schlosser | May 4, 1943 |
| 2,470,655 | Shaw | May 17, 1949 |
| 2,600,632 | French | June 17, 1952 |
| 2,600,633 | French | June 17, 1952 |
| 2,606,503 | Shaw | Aug. 12, 1952 |
| 2,612,114 | Ernst | Sept. 30, 1952 |
| 2,618,224 | Haugdahl | Nov. 18, 1952 |
| 2,630,681 | Ferris | Mar. 10, 1953 |
| 2,678,607 | Hufferd et al. | May 18, 1954 |
| 2,700,341 | Smirl | Jan. 25, 1955 |
| 2,716,946 | Hardy | Sept. 6, 1955 |
| 2,724,339 | O'Connor et al. | Nov. 22, 1955 |